INVENTOR.
JOHN J. BLOOMFIELD
BY
George C. Sullivan
Agent.

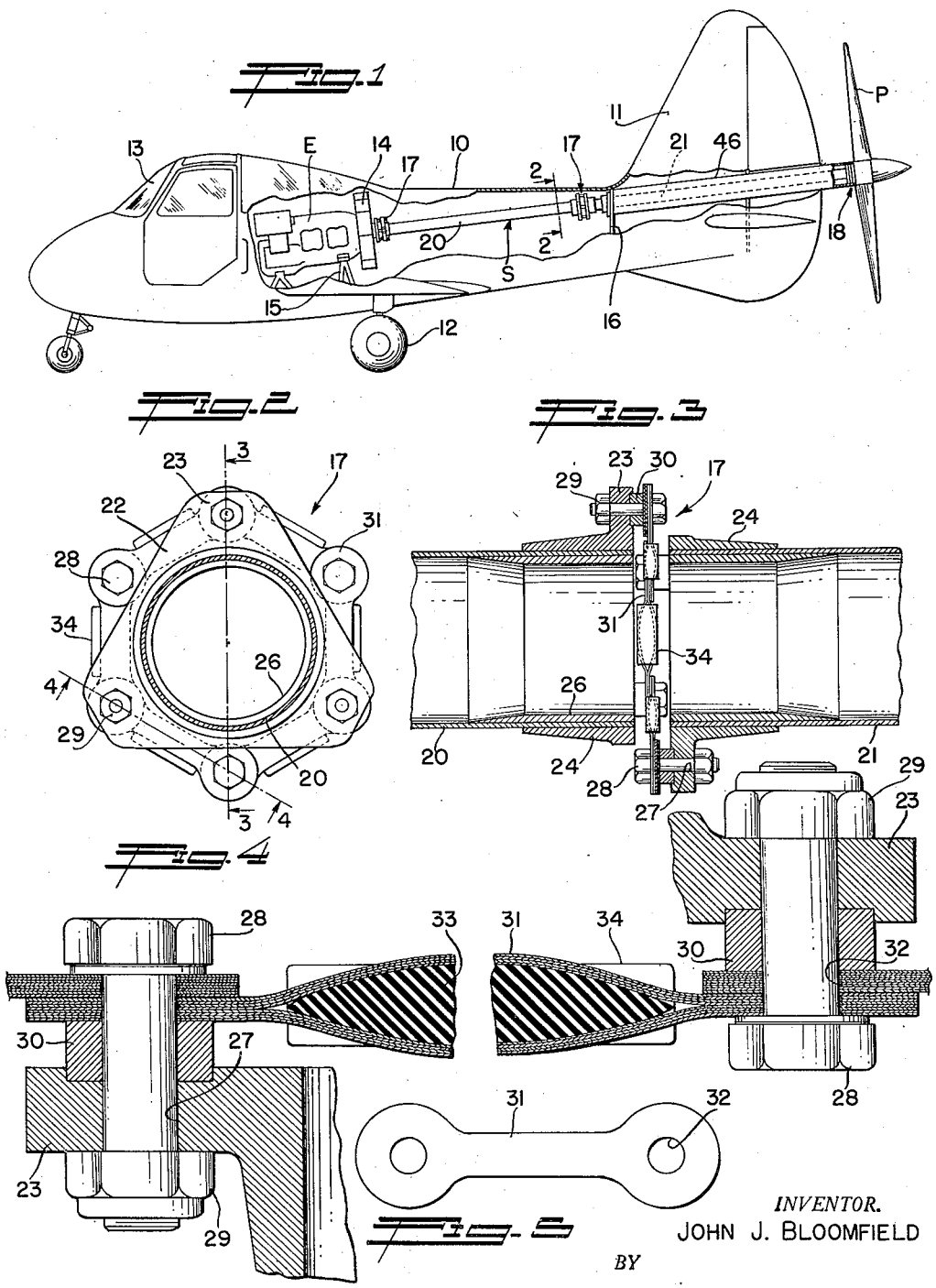

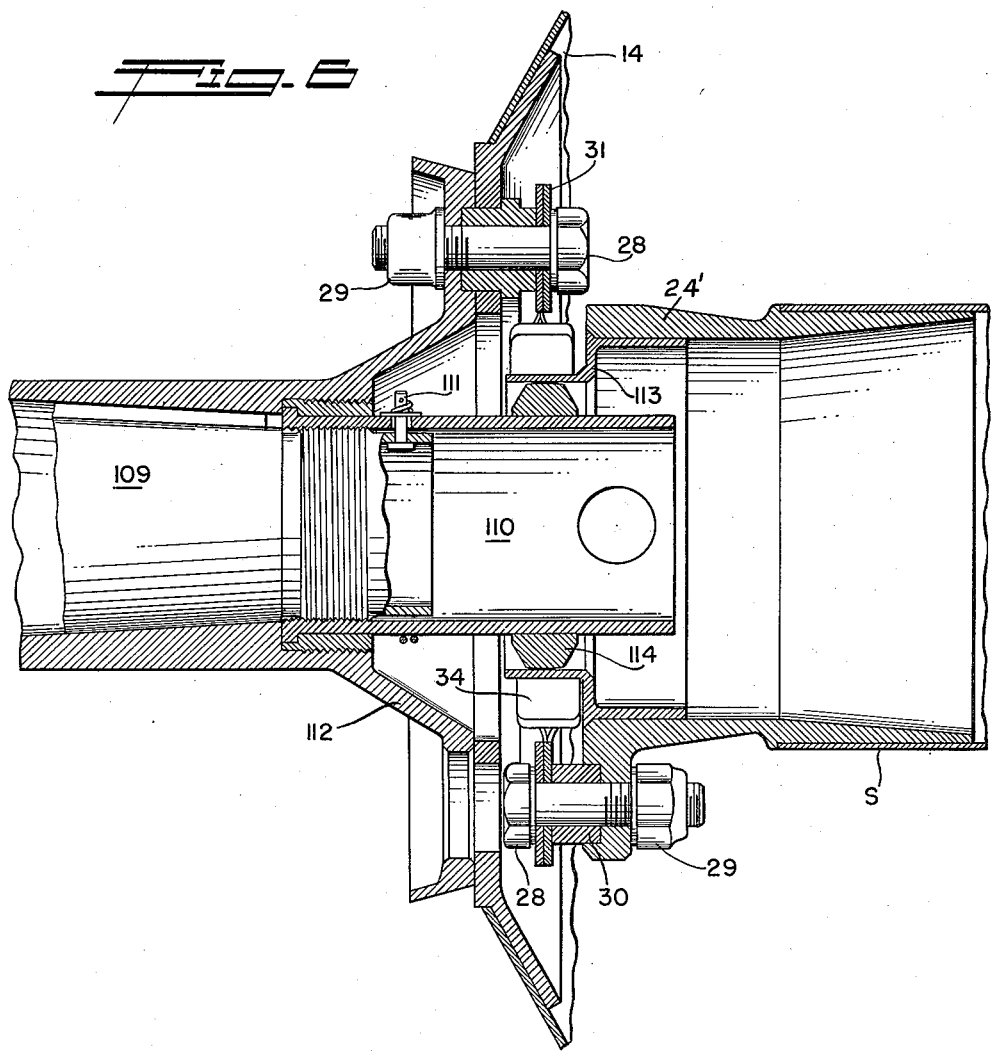

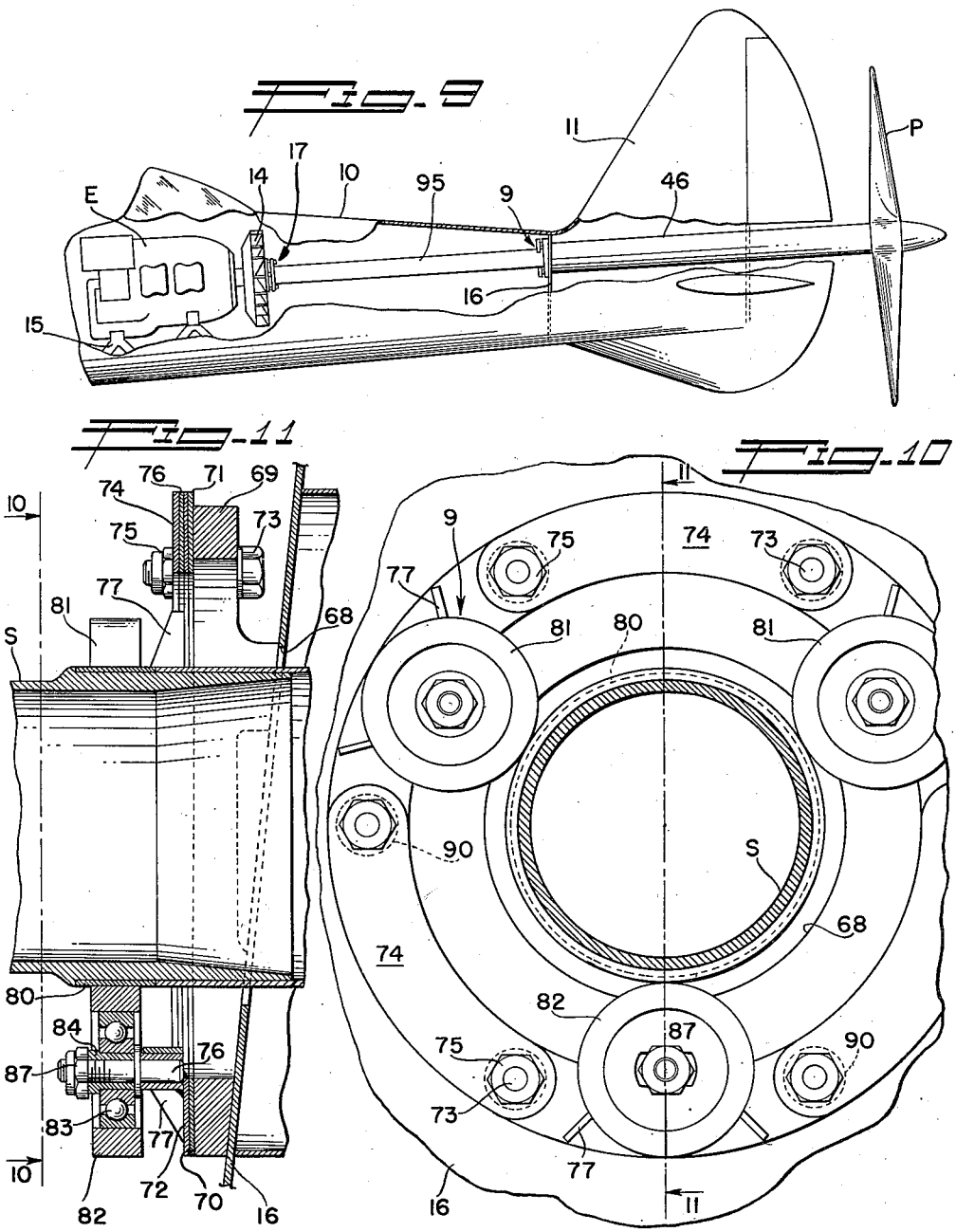

Patented Dec. 5, 1950

2,532,755

UNITED STATES PATENT OFFICE 2,532,755

AIRCRAFT PROPELLER DRIVE

John J. Bloomfield, Burbank, Calif., assignor to Lockheed Aircraft Corporation, Burbank, Calif.

Application February 21, 1946, Serial No. 649,339

8 Claims. (Cl. 244—65)

This invention relates to power transmitting equipment, and relates more particularly to propeller drives for aircraft. It is a general object of the invention to provide a practical, effective propeller drive which reduces vibration effects to a minimum.

In aircraft employing propellers as a means of propulsion, it is desirable to reduce the transmission of propeller vibration to the aircraft structure. In situations where the propeller is remote from the engine and a long shaft is employed, there is a tendency for the shaft to vibrate and aggravate the vibration of the propeller. In an airplane having the engine well forward in the fuselage and a "pusher" propeller aft of the empennage, it is desirable to isolate, as far as possible, the vibration of both the propeller and shaft from the fuselage and other parts of the airplane structure. In the following description I will describe the invention embodied in an airplane of the general class just mentioned, it being understood that this is merely a typical application and embodiment of the invention.

It is an important objective of the invention to provide a propeller drive for use in an airplane having a long, or relatively long, shaft extending from the engine to the propeller which embodies means for reducing vibration of the shaft and propeller and for isolating or disassociating the residual vibration from the airplane structure.

Another object of the invention is to provide a propeller drive having means for damping or reducing propeller vibration at the propeller hub and for eliminating to a substantial degree, the transmission of propeller vibration to the shaft. The improved drive of the invention embodies a sleeve assembly of resilient vibration absorbing material interposed between the propeller and its shaft, which materially dampens propeller vibration and isolates the vibration from the propeller shaft.

Another object of the invention is to provide a propeller drive incorporating improved flexible couplings interposed at one or more points in the propeller shaft for absorbing angular and torsional vibration, and for reducing the transmission of engine vibration to the shaft. The improved couplings are flexible axially of the shaft, angularly in all directions with respect to the shaft, and are torsionally flexible, yet strong and light in weight.

A further object of the invention is to provide a propeller drive of the class referred to embodying novel bearing means for the shaft which permit limited radial movement thereof against a selected resistance so that the shaft may find its own axis of rotation to reduce vibration and to reduce the transference of vibration to the fuselage and structure of the airplane. End or axial thrust is dependably transmitted from the shaft to the structure, while at the same time vibration and "whipping" is reduced to a large degree by the frictionally resisted ability of the shaft to find its own axis of rotation.

A still further object of the invention is to provide a propeller drive in which the several above mentioned features and elements mutually contribute in reducing propeller and propeller shaft vibration, and in avoiding the transmission of such vibration to the airplane structure.

Other objects and features of the invention will be readily understood from the following detailed description of typical preferred forms of the invention wherein reference will be made to the accompanying drawings in which:

Figure 1 is a side elevation of an airplane embodying one form of drive of the invention with a portion broken away to show the drive in elevation;

Figure 2 is an enlarged end view of one of the flexible couplings being a view taken substantially as indicated by line 2—2 on Figure 1;

Figure 3 is a fragmentary longitudinal section taken substantially as indicated by line 3—3 on Figure 2;

Figure 4 is an enlarged fragmentary sectional view of the coupling taken as indicated by line 4—4 on Figure 2;

Figure 5 is a side elevation of one of the spring links of the coupling;

Figure 6 is an enlarged longitudinal section of the flexible coupling at the engine shaft, illustrating the centralizing means;

Figure 9 is a fragmentary side elevation of an airplane embodying another form of propeller drive of the invention with the airplane broken away to show the drive in side elevation;

Figure 10 is an enlarged front elevation of the intermediate shaft bearing taken substantially as indicated by line 10—10 on Figure 11; and Figure 11 is a vertical sectional view of the intermediate bearing taken substantially as indicated by line 11—11 on Figure 10.

Figure 7:
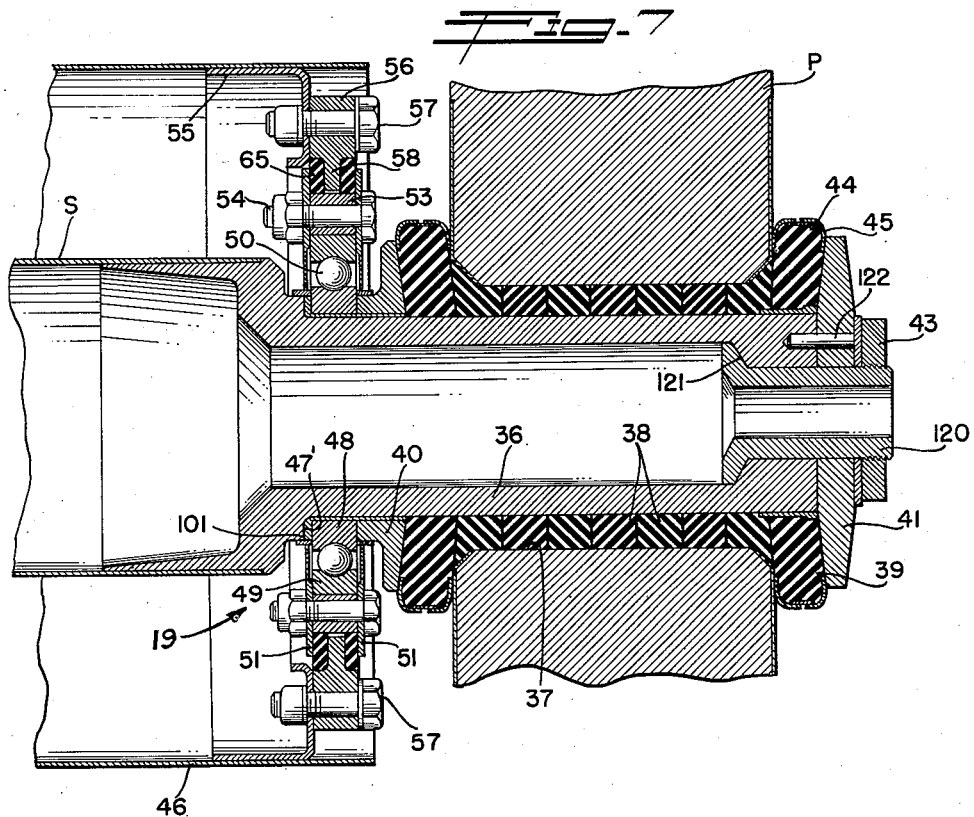
Figure 7 is an enlarged longitudinal section illustrating the propeller hub and thrust bearing assembly.

In the drawings, the invention is illustrated incorporated in an airplane in which the propeller P is spaced aft of the empennage, and the engine E is well forward in the fuselage. The invention is, of course, adapted for use in aircraft of other designs and is not to be construed as restricted to the particular installation or details herein described. The portion of the airplane appearing in Figures 1 and 8 comprises a fuselage 10 provided at its aft end with an empennage 11, and at its under side with appropriate landing gear 12. The engine E is mounted in the fuselage 10 behind the pilot's compartment 13 and is cooled by a fan 14 associated with its shaft. Suitable mounting means 15 supports the engine E. A substantially vertical bulkhead 16 is provided in the fuselage 10 just forward of the empennage 11. The propeller P is at the rear of the empennage 11 and is arranged to have its axis in alignment with the axis of the engine, which is inclined upwardly and rearwardly, assuming the airplane to be in the attitude of Figures 1 and 9.

The embodiment of the invention shown in Figures 1 to 8 inclusive, and 10 and 11, may be said to comprise generally a shaft S, flexible couplings 17 associated with the shaft, means 18 for securing the propeller P to the shaft, and bearing means 19 and 9 for the shaft.

The shaft S serves to transmit power from the engine E to the propeller P and extends rearwardly through the fuselage 10 to project beyond the empennage 11. In accordance with the invention, the shaft S is tubular to reduce its weight and inertia, and in practice, may be formed of one or more lengths of Dural tubing, or tubing of other suitable light-weight alloys. It is contemplated that the shaft S may be a single, continuous, one-piece member extending from the engine shaft to the propeller hub assembly. However, where the mounting of the engine E permits limited movement or vibration of the engine in a lateral direction, it may be desirable to employ a shaft having at least two sections connected by a flexible coupling 17. In Figure 1 it will be assumed that the engine mounting means 15 allows lateral vibration, and I have shown a shaft S comprising two sections 20 and 21 connected by a coupling 17. A similar or identical coupling 17 connects the shaft 16 with the engine shaft 109.

The two couplings 17 may be identical, and I will proceed with a detailed description of the coupling which connects the two shaft sections 20 and 21, it being understood that this description is applicable to the other coupling, and that corresponding reference numerals are applied to corresponding parts of the two couplings.

The coupling 17 is constructed to be flexible or somewhat yieldable axially of the shaft 16 as well as in all directions angularly of the shaft 16 and to have torsional resiliency. The coupling includes two similar flange members 22 fixed to the adjacent opposing ends of the shaft sections 20 and 21. As best illustrated in Figures 2 and 3, the members 22 are substantially triangular in outline, each having three radially projecting apex parts or ears 23, and each having a hub 24 for attachment to the respective shaft section. The tubular hubs 24 are of sufficient length to have extensive connection with the shaft sections. The invention contemplates that the hubs 24 may be either secured within the tubular shaft sections, or secured to the exteriors of the shaft parts. In either case it is preferred that the connection be effected by a synthetic cement layer. In the drawings I have shown the hubs 24 engaged around the shaft sections 20 and 21, and shrunk thereon to be secured to the shafting by intermediate layers of a suitable cement such as "Cycleweld." The shrinking operation assures the effective bonding contact of the cement to the shaft sections and hubs throughout the entire extents of the hubs. It is to be understood that in operation of the drive, the stress is actually transmitted by the cement and not by direct metal-to-metal contact. Where the hubs 24 are secured around the shaft sections 20 and 21, it may be desirable to provide reinforcing sleeves 26 within the shafting.

The two coupling members 22 are related so that their ears 23 are angularly offset, the ears of one member being offset substantially 60° from the adjacent ears of the other member. Axial openings 27 in the ears 23 receive bolts 28, and nuts 29 are provided on the bolts to cooperate with the outer sides of the ears. There is a separate bolt 28 associated with each ear 23. It is preferred to equip the bolts 28 with lock nuts, or with nuts that will not work loose. A tubular spacer 30 is engaged on each bolt 28 to seat in a counterbore in the inner side of the adjacent ear 23.

Angularly and axially flexible and torsionally resilient link assemblies extend between the adjacent bolts 28 of the two flange members 22 for the transmission of torque or driving loads between the two shaft sections 20 and 21. Each of these link assemblies comprises two groups of hardened spring steel links or leaves 31. The leaves 31 may have a thickness of approximately .006 inch, and are preferably hardened to about 300,000 pounds ultimate strength. Each group of link leaves 31 comprises a plurality of similar leaves engaged in face-to-face relation to form a compact assembly of high strength of considerable resiliency. The two groups of leaves 31 of each link assembly are provided at their opposite ends with openings 32 for receiving the bolts 28. The links or leaves 31 are preferably shaped to each have two end lobes having peripheries concentric with their openings 32, the lobes being joined by narrow ties or necks having a width substantially equal to the effective width of the perforated lobes. This is shown in Figure 5. As illustrated in Figure 4, the lobe portions of adjacent link assemblies are overlapped at the bolts 28 and their end portions are clamped together between the above mentioned spacers 30 and the heads of the bolts.

Each link assembly further includes a core or spacer 33 of resilient material engaged between its two bundles of spring leaves. The bundles or groups of leaves 31 are bowed outwardly or away from one another, and the resilient spacers 33 are received between and shaped to conform generally to the bowed portions of the leaves. The spacers 33 are formed of rubber, synthetic rubber or similar elastic material which "compresses" or flows when the transmission of torque through the related link assemblies tends to straighten the bowed leaves 31 and which "expands" or tends to return to its original configuration when the torque load is removed from the links. The spacers 33 are tightly engaged between the sets of link leaves 31, but it is desirable to provide means for preventing radial displacement of the spacers by centrifugal force. This means may consist of flanges 34 on the spacers 33 for engaging the inner and outer edges of the link leaves 31 to hold the spacers against outward movement.

The flexible resilient sets of link leaves 31 allow limited axial and angular relative movement between the shaft sections 20 and 21, and the resilient spacers 33 provide for torsional resiliency and flexibility in the coupling. It will be observed that there are six link assemblies in the particular coupling illustrated. Three of these link assemblies transmit torque or load in one direction, and the three intervening or alternate link assemblies transmit torque applied in the other direction. Upon an increase in the torque load in one direction, three spaced link assemblies are subjected to increased tension so that their bowed spring leaves 31 tend to straighten out. The resultant inward flexure of the spring steel leaves 31 is yieldingly resisted by the resilient spacers 33. This imparts torsional resiliency or flexibility to the link assemblies and the shaft coupling. This torsional resiliency and flexibility, combined with the angular flexibility inherent in the link leaves 31, gives the assembly substantially universal flexibility.

It is desirable to provide centralizing means in the flexible couplings 17 to maintain the connected shaft sections in coaxial relation and to prevent disassociation of the sections in the event of failure of the couplings. The centralizing means may be incorporated in both couplings 17, although I have omitted this feature from Figures 2, 3 and 4 for the sake of clarity. Referring now to Figure 6, which illustrates the coupling 17 between the engine shaft 109 and the shaft S, the centralizing means includes a tube member 110 threaded on the end portion of the engine shaft 109. A safety wired pin 111 locks the member 110 on the shaft and the member is shouldered at its forward end to cooperate with a bushing of the hub assembly 112 for the fan 14. The member 110 extends rearwardly to enter a flanged tubular element 113 secured in the coupling member 24'. The element 113 surrounds the tubular member 110 with considerable clearance. The centralizing means further includes a ring 114 of "Micarta," or the like, fixed on the exterior of the member 110 as by "Cycleweld" cement. It is preferred to spherically curve the periphery of the ring 114 about a point at the intersection of the longitudinal axis of the shaft assembly and the central transverse plane of the coupling 17. This permits a "universal joint" action at the coupling 17.

The propeller hub means 18 provides for the dependable connection of the propeller P with the shaft assembly without the necessity of employing propeller-engaging bolts, or the like, and without the danger of splitting the propeller hub. It is a feature that the improved hub means of the invention is effective in absorbing or dampening propeller vibration and shaft vibration. The propeller mounting means includes a tubular member 36 secured to the aft end of the shaft S to constitute an extension thereof. The member 36 may be secured to the shaft in any appropriate manner, but it is preferred to employ a cemented connection of the type illustrated. The member 36 is enlarged in external diameter at its forward end and this enlarged portion is entered in the rear end of the shaft section 21. A layer of synthetic cement such as "Cycleweld" is provided between surfaces of the shaft section 21 and the member 36, and the shaft section is shrunk onto the member to assure a uniform and continuous cement bond. It will be apparent that if desired the arrangement just described may be reversed, in which case the member 36 is cemented and shrunk onto the exterior of the shaft section 21.

The shaft extension member 36 continues rearwardly from the shaft and passes through a central opening 37 in the propeller hub. The external diameter of the member 36 is considerably less than the diameter of the propeller opening 37, and the member is of sufficient length to extend rearwardly beyond the propeller hub. A body of flexible resilient material such as rubber, rubber composition, or synthetic rubber, occupies the annular space between the wall of the opening 37 and the peripheral surface of the member 36. This body of material may be provided in the form of a single tubular part, but I prefer to employ a plurality of separately formed rings 38 of the flexible resilient material which surround the member 36 and engage the wall of the propeller opening 37. End rings 39 constructed of the same or a similar elastic material surround the member 36 at the ends of the series of rings 38. The end rings 39 are larger in external diameter to have portions projecting radially outward at the ends of the propeller hub.

The rings 38 and 39 are maintained under compression to provide a torque transmitting connection between the shaft extension member 36 and the propeller P. The means for applying and maintaining the compression on the rings 38 and 39 includues a metal ring 40 engaged by the forward end ring 39 and a metal ring 41 engaging the rear end ring 39. The forward ring 40 is flanged or increased in external diameter to cooperate with an extensive area of the forward rubber ring 39, and its rear face slopes forward and radially outward. The compression ring 40 is held against forward displacement by an element of the thrust bearing means to be subsequently described. The rear compression ring 41 has a radially and rearwardly sloping surface for engaging the rear rubber ring 39. A tubular stub or stud 120 is arranged in the shaft extension 36 to engage rearwardly against a shoulder 121 in the extension. The stud 120 projects rearwardly from the washer or ring 41 and a nut 43 is threaded on the projecting portion to clamp against the ring. A dowel pin 122 holds the ring against rotation. The parts are proportioned and related so that when the nut 43 is tightened down to bring the ring 41 to its final position, the rings 38 and 39 are compressed to the extent that they form a positive, dependable, yet somewhat yielding, connection between the propeller P and the member 36. During tightening down of the nut 43, the rubber rings 38 and 39 are compressed in the axial direction and expand radially inward and radially outward; that is, the material of the rings flows radially in both directions. This brings the material of the rings 38 and 39 into tight frictional cooperation with the walls of the propeller hub opening 37 and the propeller surface of the member 36, and compacts the material so that it forms a strong load transmitting annular layer between the shaft extension member 36 and the propeller P. The material of the compressed rings 38 and 39 acts somewhat in the manner of a fluid, and the "expansive forces" or radical pressures which it exerts on the propeller P and the member 36 are uniformly distributed. The torque loading, during operation, is likewise uniformly distributed throughout the engaged surfaces of the member 36 and propeller P.

There may be a tendency for the material of the end rings 39 to flow or extrude from between the hub surfaces and the compressing rings 40 and 41. A metal band 44 engages around the periphery of each ring 39 and rings 45 of curved or substantially L-shaped cross section are arranged to engage the side faces of the rings 39 and to lap over the bands 44. The inner flanges of the rings 45 engage the end surfaces of the compressing rings 40 and 41 and the ends of the propeller hub. The bands 44 and rings 45 define the peripheral parts of the endmost rubber rings 39 to prevent radial extrusion of the rubber or rubber-like material. The propeller mounting just described is effective in securing propellers of any construction to their drive shafts, but is particularly advantageous in mounting wooden propellers because it avoids the necessity of engaging the propeller with metal bolts, clamps, and the like, and there is no need to weaken the propeller hub by the provision of bolt holes. It will be noted that the compressed radial flanges of the endmost rubber rings 39 center the propeller P and hold it against axial movement.

Figure 8:
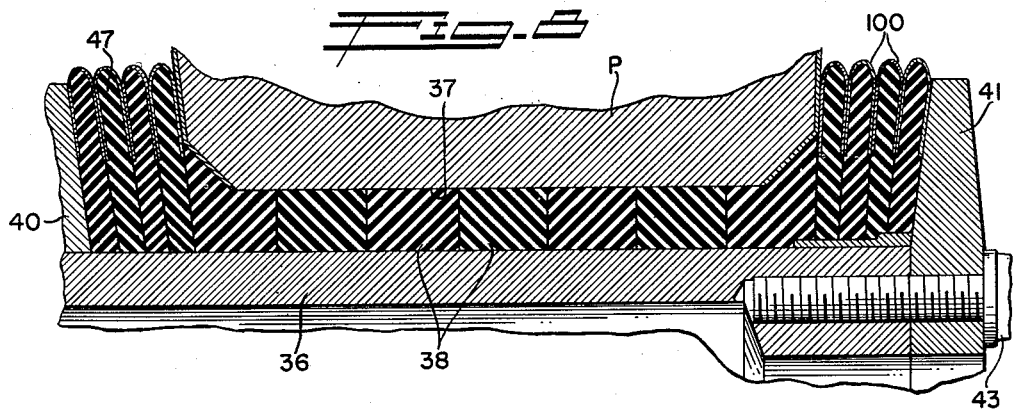
Figure 8 is an enlarged fragmentary sectional view of a portion of the propeller hub mounting of slightly different construction.

Figure 8 illustrates a modification of the propeller mounting which provides for increased torsional or angular flexibility. In this construction, the member 36, the inner elastic rings 38, and the compressing plates 40 and 41, may be substantially the same as described above. However, the compression plate 41 is actuated and secured by screws 43 threaded into openings in the end of the shaft extension 35. Instead of the one-piece end rings 39, sectional or laminated ring assemblies are provided at each end of the propeller hub. Each of these assemblies comprises a plurality of rings or discs 47 of selected elastic material arranged in face-to-face relation between the rings 40 and 41, and the ends of the propeller. The discs 47, together with rings 38, are subjected to compression when the screws 43 are tightened down. The discs 47 are provided with rims 100 of metal which are generally U-shaped in cross section to engage over the peripheries of their respective discs 47 and to have side flanges engaging the side faces of the discs. These side flanges are of substantial extent, and the flanges of the rims on the adjacent discs 47 bear one against the other. This arrangement is such that there may be limited angular movement between adjacent discs 47 when the assembly is subjected to varying torque loading, the relative movement absorbing or dampening out the vibration that otherwise might result. The individual discs 47 and their rims provide a substantial number of cooperating surfaces where the desirable limited relative movement may take place and thus impart considerable torsional resiliency to the propeller mounting.

In an airplane of the general type illustrated, where the propeller P is positioned at the rear of the empennage, the problem of mounting the bearings for the extended shaft S is encountered. The present invention provides a thrust bearing means located adjacent the propeller hub and supported from the above mentioned bulkhead 16 of the airframe structure. A bearing supporting tube 46 is fixed to the bulkhead 16 and extends rearwardly therefrom in spaced surrounding relation to the shaft section 21. The tube 46 passes freely through the empennage structure and projects rearwardly beyond the empennage to have its rear portion surround the forward part of the shaft extension member 36. The improved thrust bearing assembly of the invention mounts the member 36 in the aft end of the tube 46. The tube 46 is a rigid member capable of adequately supporting the thrust bearing independently of the adjacent empennage structure.

The thrust bearing assembly includes an inner race 48 engaged on the shaft member 36, an outer race 49 and a series of balls 50 engaged between the races. The inner race 48 seats against a rearwardly facing shoulder 47' on the member 36 through the medium of a flanged sleeve 101 and forms a stop or abutment for preventing forward movement of the above described ring 40 of the propeller mounting means. A ring 53 surrounds the outer race 49 and annular plates 51 engage the front and rear faces of the race 49 to substantially close the annular ball-carrying space between the two races. Circumferentially spaced bolts 54 pass through axial openings in the plates 51 and the ring 53 to secure the plates in position. The parallel plates 51 extend radially outward beyond the ring 53.

The thrust bearing means further includes an assembly on the above described tube 47. This assembly includes an annular channel-shaped or flanged member 55 suitably secured to the interior of the tube 47. A ring 56 is attached to the member 55 by spaced bolts 57 to be in spaced surrounding relation to the ring 53 of the inner assembly. A central annular flange 58 projects inwardly from the ring 56 toward the inner ring 53. The opposing surfaces of the ring 53 and flange 58 are in spaced concentric relation. The above described plates 51 lap over the flange 58 with clearance.

The floating thrust bearing means further includes means for yieldingly resisting lateral or radial play of the shaft assembly and for dampening or absorbing vibration. This means comprises rings 65 of elastic material such as rubber, rubber composition, or the like, clamped between the plates 51 and the sides of the flange 58. The outer peripheries of the rings 65 engage the internal surface of the ring 56 and the internal surfaces of the yielding rings have engagement with the inner ring 53. The thrust bearing means just described serves to transmit the end thrusts from the shaft assembly to the rigid tube 47, which in turn, carries them directly to the fuselage structure. The yielding rings 65 engaged between the thrust plates 51 and the flange 58 permit limited lateral and axial movement of the shaft assembly, which movement is controlled or resisted by the confined elastic material of the rings. The yielding rings 65 effectively isolate shaft and propeller vibration from the airframe and allow the shaft to find its own center of rotation within defined limits.

The bearing means 9 is provided at the bulkhead 16 or similar part of the airplane structure to support the shaft S at a point intermediate its ends. The character of the bearing means 9 depends to some extent upon the manner in which the engine E is mounted, and upon the flexibility of the propeller drive as a whole. I have shown a midship bearing for the shaft S which may be set or adjusted to provide for any selected resistance to radial or lateral movement of the shaft. With a proper setting or adjustment, the bearing means allows the shaft S to find its own axis of rotation but offers desirable frictional resistance to vibration and lateral motion. The construction is such that it effectively isolates vibration of the shaft from the airframe and yet provides ample bearing support for the intermediate portion of the shaft.

Referring to Figures 10 and 11, it will be seen that the bulkhead 16 has an opening 68 passing the shaft S with substantial clearance. A mounting adaptor 69 is fixed to the front face of the inclined bulkhead to surround the opening 68 and present a forward face 70 which is substantially normal to the longitudinal axis of the shaft S. The face 70 is annular, and a gasket ring 71 of frictional material is cemented to it. A steel bearing carrier or ring 72 is arranged to bear against the friction ring 71, being held in position by bolts 73 engaged in openings in the adapter 69. Link-like retainers 74 are engaged on adjacent pairs of bolts 73 to bear against the forward face of the ring 72. The nuts 75 threaded on the bolts 73 urge the retainers 74 against the ring 72 and accordingly urge the ring against the friction material 70. Friction material shoes 76 may be provided on the inner faces of the retainers 74 to cooperate with the ring 72. The retainers 74 may be in the form of leaf springs to exert controlled pressure against the ring 72 as determined by the setting of the nuts 75. In any case, the nuts 75 may be adjusted or set to provide any selected resistance to movement of the plate or ring 72 relative to the adapter 69. The openings 90 in the ring 72 which pass the bolts 73 are enlarged in diameter with respect to the bolts to allow limited controlled or resisted movement of the carrier ring relative to the adapter 69.

The bearing means 9 further includes spaced anti-friction rollers mounted on the carrier or ring 72 to support the shaft S. Where the shaft S is constructed of an aluminum alloy, or the like, it is preferred to provide a wear resistant band 80 of steel on the shaft to be engaged by the rollers. The wear-taking band 80 may be cemented to the shaft. There are preferably three spaced shaft supporting rollers, two side rollers 81 and a lower roller 82. The rollers 81 and 82 are carried by anti-friction bearings 83 which in turn are mounted on bushings 84 supported by studs 76. The studs 76 project forwardly from brackets 77 welded or otherwise fixed to the ring 72. The bushing 84 of the lower roller assembly is constructed to permit adjustment of the roller 82. An eccentric longitudinal opening in this bushing 84 receives the mounting stud 76 whereby the roller may be adjusted with respect to the shaft S. Upon tightening of the nut 87 on the stud 76 the bushing 86 is set or secured in the adjusted position. The upper or side rollers 81 cooperate with the shaft band 80 at points well above the central horizontal plane of the shaft while the lower roller 82 engages the band at a central lower point. With this three-point roller contact, the shaft S is constrained against lateral or radial movement relative to the carrier ring 72, or in other words, the ring is obliged to move with the shaft in lateral directions. Such movement of the carrier ring 72 is resisted by the friction shoes 76 and friction gasket 70, and is definitely limited by the engagement of the walls of the openings 90 with the bolts 73.

Figure 9 illustrates an embodiment of the invention having a continuous or one-piece shaft 95. A one-piece shaft of this kind may be employed where the engine mount 15 is such that vibration of the engine is controlled or kept at a minimum. A flexible coupling 17 serves to connect the shaft 95 with the crankshaft of the engine E. The coupling 17, propeller hub assembly 18, the thrust bearing 19 and the midship bearing 9 are the same as described above and corresponding reference numerals are applied to corresponding parts in the two illustrated forms of the invention.

From the above detailed description it will be seen that I have provided a dependable lightweight propeller drive useful where an extended or elongate drive shaft is required. The flexible coupling means 17, the propeller mounting 18 and the two bearing means 19 and 9 mutually cooperate in reducing shaft vibration to a minimum and in isolating the vibration from the airframe structure. The flexible coupling means 17 allows flexure in the direction of rotation of the shaft, axially of the shaft, and in all directions angular of the shaft, and yet is positive in the transmission of torque. The resilient rings 38 and 39 of the propeller hub assembly assist in dampening vibration and effectively transmit torque by friction from the shaft means to the propeller. The vibration absorbing thrust bearing means 19 transmits the end loads from the shaft assembly to the airframe structure through the medium of the tube 47, and allows the shaft assembly to find its own axis of rotation. This latter feature eliminates the transmission of considerable propeller and shaft vibration to the airplane. The midship bearing means 9 dependably supports the intermediate portion of the shaft, while offering yielding or frictional resistance to radial or lateral movement. In this way the shaft may find its own axis of rotation within a limited range of movement, but whipping of the shaft is effectively controlled. In initially installing the mechanism, the shaft may be accurately aligned and centered before tightening the nuts, and subsequently, resistance to shaft vibration may be readily regulated by adjusting the nuts 75. The bearing means 9 is simple in construction and its parts are readily accessible for inspection and replacement.

Having described only typical forms of the invention, I do not wish to be limited to the specific details herein set forth, but wish to reserve to myself any variations or modifications that may appear to those skilled in the art or fall within the scope of the following claims.

I claim:

1. In an airplane having a fuselage and an empennage the combination of, an engine mounted in the fuselage, a propeller spaced to the rear of the empennage, a drive shaft coupled with the engine and extending to the propeller to drive the same, a tubular member spaced around the shaft and having its forward portion in the fuselage, the member passing freely through the empennage to adjacent the propeller, means fixedly securing the forward portion of said member in the fuselage so that the member constitutes a cantilever, and thrust bearing means for the shaft carried by the rear portion of the member.

2. In an airplane having a fuselage and empennage the combination of, an engine mounted in the fuselage, a propeller spaced to the rear of the empennage, a drive shaft coupled with the engine and extending to the propeller to drive the same, a support in the fuselage between the ends of the shaft, bearing means carrying the intermediate portion of the shaft, means mounting the bearing means on the support for limited resisted movement in a plane substantially normal to the longitudinal axis of the shaft so that the shaft may find its axis of rotation, and thrust bearing means for the aft end portion of the shaft.

3. In an airplane having a fuselage and an empennage the combination of, an engine mounted in the fuselage, a propeller spaced to the rear of the empennage, a drive shaft coupled with the engine and extending to the propeller to drive the same, a support in the fuselage between the ends of the shaft, bearing means carrying the intermediate portion of the shaft, means mounting the bearing means on the support for limited resisted movement in a plane substantially normal to the longitudinal axis of the shaft so that the shaft may find its axis of rotation, a thrust bearing for the aft end portion of the shaft, and means supporting the thrust bearing for limited floating movement.

4. In an airplane having a fuselage and an empennage the combination of, an engine mounted in the fuselage, a propeller spaced to the rear of the empennage, a drive shaft coupled with the engine and extending to the propeller to drive the same, a support in the fuselage between the ends of the shaft, bearing means carrying the intermediate portion of the shaft, means mounting the bearing means on the support for limited resisted movement in a plane substantially normal to the longitudinal axis of the shaft so that the shaft may find its axis of rotation, means for regulating the resistance to movement of the bearing means, and thrust bearing means for the aft end portion of the shaft.

5. In an airplane having a fuselage and an empennage the combination of, an engine mounted in the fuselage, a propeller spaced to the rear of the empennage, a drive shaft coupled with the engine and extending to the propeller to drive the same, a support in the fuselage between the ends of the shaft, an adapter on the support presenting a surface normal to the shaft, a carrier arranged for limited movement on said surface, bearing means on the carrier for supporting the intermediate portion of the shaft, and means for frictionally resisting movement of the carrier on said surface.

6. In an airplane having a fuselage and an empennage the combination of, an engine mounted in the fuselage, a propeller spaced to the rear of the empennage, a drive shaft coupled with the engine and extending to the propeller to drive the same, a support in the fuselage between the ends of the shaft, an adapter on the support presenting a surface normal to the shaft, a carrier arranged for limited movement on said surface, bearing means on the carrier for supporting the intermediate portion of the shaft, and means for frictionally resisting movement of the carrier on said surface, and means for urging the carrier toward said surface.

7. In an airplane having a fuselage and an empennage the combination, an engine mounted in the fuselage, a propeller spaced to the rear of the empennage, a drive shaft coupled with the engine and extending to the propeller to drive the same, a support in the fuselage between the ends of the shaft, an adapter on the support presenting a surface normal to the shaft, a carrier arranged for limited movement on said surface, bearing means on the carrier for supporting the intermediate portion of the shaft, friction means for resisting movement of the carrier on said surface, and means for regulating the frictional resistance to such movement.

8. In an airplane having a fuselage and an empennage the combination of, an engine mounted in the fuselage, a propeller spaced to the rear of the empennage, a cooling fan driven by the engine shaft at the rear thereof for circulating air rearwardly over the engine, a propeller shaft extending rearwardly through the empennage to the propeller to drive the same, a flexible coupling between the engine shaft and propeller shaft, bearing means for the shaft, and means mounting the bearing means for limited resisted lateral movement.

JOHN J. BLOOMFIELD.

REFERENCES CITED

The following references are of record in the file of this patent:

UNITED STATES PATENTS

| Number | Name | Date |
|---|---|---|
| 1,180,347 | Warren | Apr. 25, 1916 |
| 1,386,493 | Guyot | Aug. 2, 1921 |
| 1,414,241 | Wells | Apr. 25, 1922 |
| 1,763,409 | Orsett | June 10, 1930 |
| 1,947,052 | Lock | Feb. 13, 1934 |
| 2,305,454 | Nallinger | Dec. 15, 1942 |
| 2,326,104 | Petrich | Aug. 3, 1943 |
| 2,367,190 | Badrutt | Jan. 16, 1945 |

OTHER REFERENCES

Publications: "Aviation," page 47, April 1941; ibid, pp. 37–41, Feb. 1947; and "Jane's All the World's Aircraft," page 223c, 1947.